W. C. REINHARDT AND O. H. BANKER.
TIRE CUTTING MACHINE.
APPLICATION FILED SEPT. 2, 1919.

1,393,164.

Patented Oct. 11, 1921.
2 SHEETS—SHEET 1.

Fig. 1.

Inventors,
W. C. Reinhardt
O. H. Banker

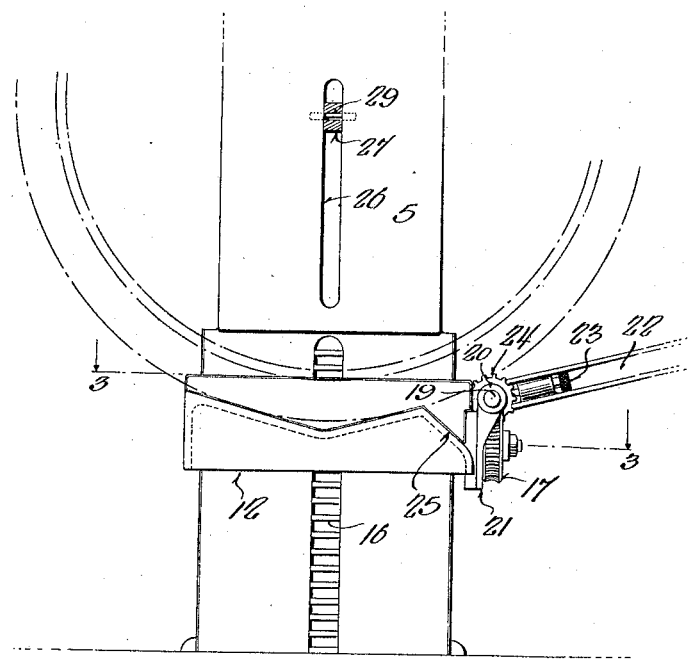
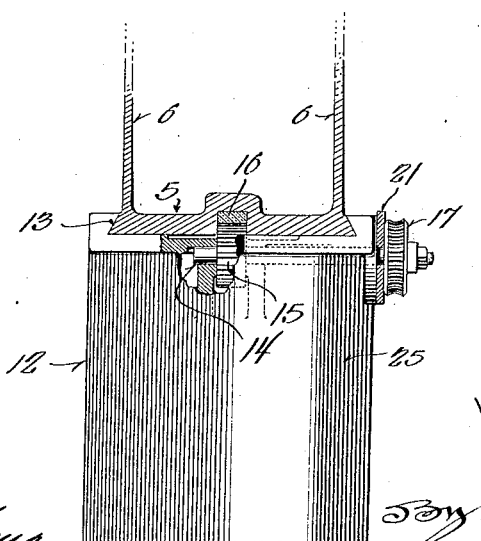

UNITED STATES PATENT OFFICE.

WILLIAM C. REINHARDT AND OSCAR H. BANKER, OF RACINE, WISCONSIN, ASSIGNORS TO RACINE TOOL & MACHINE CO., OF RACINE, WISCONSIN.

TIRE-CUTTING MACHINE.

1,393,164.  Specification of Letters Patent.  Patented Oct. 11, 1921.

Application filed September 2, 1919. Serial No. 321,136.

*To all whom it may concern:*

Be it known that we, WILLIAM C. REINHARDT and OSCAR H. BANKER, citizens of the United States, and residents of Racine, in the county of Racine and State of Wisconsin, have invented certain new and useful Improvements in Tire-Cutting Machines; and we do hereby declare that the following is a full, clear, and exact description thereof.

Our invention relates to new and useful improvements in metal cutting machines of the draw-cut or hacksaw type, wherein there is provided a vertically swinging and horizontally reciprocating blade carrying frame which swings downwardly into the work material to procure the feeding movement of the saw blade.

It is primarily the object of our invention to adapt a machine of this character for performing cutting operations on large and bulky work objects.

It is more particularly our object to provide an arrangement whereby the work object may be rigidly secured in vertically adjustable position for engagement by the saw blade to effect the desired cutting operation.

In heavy automobile trucks or similar vehicle wheels, it is common practice to press the tire carrying rim onto the felly of the wheel by hydraulic pressure, and when the tire has become worn down it becomes necessary to remove the rim, which is exceedingly difficult and practically impossible to effect by pressing action should the rim become dented or bent by contact with the road in travel.

It is an important object of our invention to provide a machine of the present character which is adapted to hold a vehicle wheel of the aforementioned type whereby the rim may be readily cut to permit its removal from the felly.

With the above and other objects and advantages in view, which will be apparent as the description proceeds, our invention resides in the novel features of construction, combination and arrangement of parts, which will be hereinafter more particularly described and claimed.

In the accompanying drawings:

Figure 1 is a side elevational view of a metal cutting machine embodying our invention and showing an automobile wheel mounted in the machine, portions of the machine and wheel being broken away to more clearly disclose the structure.

Fig. 2 is an elevational view of the lower portion of the machine.

Fig. 3 is a transverse sectional view through the lower portion of the machine on a plane indicated by the line 3—3 of Fig. 2.

Referring now more particularly to the accompanying drawings, the present embodiment of our invention comprises a support casing including the front wall 5 and the side walls 6. A draw-cut unit is mounted on these walls and may constitute any suitable structure which includes a vertically swinging saw carrying frame 7 which projects laterally of the casing, said frame carrying the usual draw-cut saw blade 8 and this frame is reciprocated by a pitman 9 connected with the inner end of the frame and with a crank wheel 10, the usual mechanism for procuring proper operative movements of the saw blade frame being conventionally shown and said mechanism includes a stop member 11 whereby downward feeding movement of the saw blade is halted when the blade has attained a true horizontal position. The aforedescribed structure is conventional in nature with the exception that the saw blade projects laterally of the body casing or support of the machine, and said support is of considerable height so as to permit the placing and manipulation of a bulky work object such as an automobile wheel under the saw frame.

The work is supported in the machine by a horizontally extending table 12 which extends laterally from the lower portion of the support casing, being carried by trackways 13 at the sides of the lower portion of the front wall 5, said lower portion of the front wall being inset. This table is held in vertically adjustable position by a shaft 14 journaled under its inner portion and carrying a gear pinion 15 meshing with the teeth of a gear rack 16 mounted in the lower portion of the front wall of the support casing. This shaft is extended outwardly at one side of the casing and carries a worm gear 17 which meshes with a worm 18 on a shaft 19 disposed above said worm gear, said shaft 19 being journaled in bearings 20 mounted on a plate 21 which is disposed on the shaft 14 between the worm gear 17 and the side of the table. A handle lever 22 is pivotally mounted on the worm shaft 19 and carries a pawl 23 engageable with a ratchet wheel 24 on the shaft 19. Thus upon oscillating the handle lever 22 the worm shaft 19 will be rotated to procure a gradual vertical movement of the table, and this pawl carries a knurled head on its outer end whereby the pawl may be rotated to impart vertical movement to the work table in either direction. The top of the table 12 is depressed in substantially a wide V to procure a centered position of wheels or other round objects which may be placed thereon, and one side of the table is inclined at 25 to facilitate mounting such articles on the table. To hold a vehicle wheel rigidly on the table for cutting engagement by the saw blade 8, the front wall 5 of the support casing is provided with a vertical slot 26 in which is mounted a clamp bar 27, said bar being adapted to project through the hub of a wheel mounted on the table. This bar is adjustably held against movement outwardly from the slot by a pin 29 selectively engaged in one of the longitudinal series of openings 30 in the bar, said pin bearing against the inner side of the front wall. The outer end of the bar is rounded and threaded for the engagement of a clamp nut 31 having radial turning arms 32 thereon, and a suitable bearing member 33 preferably in the shape of a bar bent in elongated U-shape is disposed on the bar 27 between the nut and the hub of the wheel to transmit the pressure of the nut to said wheel hub.

An exceedingly simple and readily manipulated arrangement has thus been provided wherein wheels of various widths and diameters may be mounted in the machine, with their top portions disposed for proper cutting engagement by the saw blade 8, the wheel being adjusted by vertical movement of the table 12 so that the upper horizontal tangent of the felly A of the wheel, will, as shown in Fig. 1, substantially coincide with the limit of downward feeding movement of the saw-blade, thus automatically halting the cutting operation upon cutting through the rim. The exact positioning of the wheel to effect this operation is procured by alining the upper extremity of the felly with the head of a gage-screw 34 threaded in the top of the support, the head of the screw thus marking the downward limit of cutting movement of the saw-blade.

While we have shown and described a preferred embodiment of our invention, it will be appreciated that various changes and modifications of structure may be employed to meet differing conditions of use and manufacture, without departing in any manner from the spirit of our invention.

What is claimed is:

1. A machine of the class described comprising a support, a vertically movable and horizontally reciprocating cutting member carried by and extending laterally from the top of the support, a work holding table carried by and extending laterally from the support below the cutting member, and means for clamping an article seated on the table against the side of the support.

2. A machine of the class described comprising a support, a vertically movable and horizontally reciprocating cutting member carried by and extending laterally from the top of the support, a work holding table carried by and extending laterally from the support below the cutting member, means for clamping an article seated on the table against the side of the support, said means including a bar extending outwardly from the support between the table and cutting member, said bar being adapted to extend through a work object, and clamping means on the outer end of said bar.

3. A machine of the class described comprising a support, a vertically movable and horizontally reciprocating cutting member carried by and extending laterally from the top of the support, a work holding table carried by and extending laterally from the support below the cutting member, means for vertically adjusting the work table, a bar projecting outwardly from the support and connected therewith for vertical sliding movement, said bar being adapted to extend through a work article, and clamping means on the outer end of the bar.

4. A machine of the class described comprising a support, a vertically movable and horizontally reciprocating cutting member carried by and extending laterally from the top of the support, a work holding table carried by and extending laterally from the support below the cutting member, means for vertically adjusting the work table, said support being provided with a vertical slot, a bar slidably passed through the slot and provided with a longitudinal series of apertures, a stop pin selectively engaged in one of said apertures to slidably hold said bar, said bar being adapted to project from the support through a work object, and clamping means on the outer end of the bar.

5. A machine of the class described comprising a support, a vertically movable and horizontally reciprocating cutting member carried by and extending laterally from the top of the support, a work holding table mounted for vertical sliding movement under the cutting member, a gear rack carried by the support, a journaled shaft carried by the table, a gear on said shaft meshing with the gear rack of the support, and means for rotating said shaft to vertically adjust the table.

6. A machine of the class described comprising a support, a vertically movable and horizontally reciprocating cutting member carried by and extending laterally from the top of the support, a work holding table mounted for vertical sliding movement under the cutting member a gear rack carried by the support, a journal shaft carried by the table, a gear on said shaft meshing with the gear rack of the support, a shaft carried by one side of the table and extending transversely of the first shaft, a worm drive connection between said shafts, and an operating lever having ratchet connection with the second named shaft.

In testimony that we claim the foregoing we have hereunto set our hands at Racine, in the county of Racine, and State of Wisconsin.

WM. C. REINHARDT.
O. H. BANKER.